United States Patent [19]

Monte et al.

[11] 4,102,862

[45] Jul. 25, 1978

[54] APPLICATION OF CUMYLPHENOL AND DERIVATIVES THEREOF IN PLASTIC COMPOSITIONS

[75] Inventors: Salvatore J. Monte, Staten Island, N.Y.; Gerald Sugerman, Allendale, N.J.

[73] Assignee: Kenrich Petrochemicals, Inc., Bayonne, N.J.

[21] Appl. No.: 672,425

[22] Filed: Mar. 31, 1976

[51] Int. Cl.$^2$ .................................... C08G 59/56
[52] U.S. Cl. ................................ 528/88; 252/182; 260/31.2 R; 260/31.2 N; 260/348.63; 260/830 TW; 260/831; 528/87; 528/93; 528/421; 528/404; 528/408
[58] Field of Search ........ 260/47 EC, 47 EA, 47 EN, 260/2 EC, 30.4 EP, 31.2 R

[56] References Cited

U.S. PATENT DOCUMENTS

| | | | |
|---|---|---|---|
| 2,528,932 | 11/1950 | Wiles et al. | 106/287 |
| 2,801,229 | 7/1957 | DeHoff et al. | 260/47 |
| 3,637,902 | 1/1972 | Dukes et al. | 260/830 TW |
| 3,717,593 | 2/1973 | Zondler et al. | 260/2 N |
| 3,763,102 | 10/1973 | Hoffmann et al. | 260/47 EN |

*Primary Examiner*—Harold D. Anderson
*Assistant Examiner*—E. A. Nielsen
*Attorney, Agent, or Firm*—Bert J. Lewen

[57] ABSTRACT

The invention relates to epoxy resins admixed with cumylphenol or the carboxylic acid ester or the glycidyl ether thereof. The cumylphenol or its derivative serves as an accelerator for amine-cured epoxy systems, as a reactive diluent copolymerizable with epoxy resins, or as a non-reactive plasticizer.

14 Claims, No Drawings

APPLICATION OF CUMYLPHENOL AND DERIVATIVES THEREOF IN PLASTIC COMPOSITIONS

This invention relates to the use of cumylphenol and derivatives thereof as accelerators, reactive diluents and non-reactive plasticizers.

More specifically, this invention teaches the use of cumylphenol, admixtures thereof (particularly with alpha-methylstyrene dimer) and cumylphenyl esters as a replacement for nonylphenol and dinonylphenols as accelerators for amine-cured epoxy resins. The use of the nonylphenols as accelerators is well known and is described in U.S. Pat. Nos. 3,637,902; 3,740,373; and 3,763,102. It has been found that the cumylphenol per se is a much more effective accelerator than nonylphenol and that the mixture thereof with alpha-methylstyrene dimer provides a low-cost accelerator useful for controlling cure rates and improving the impact resistance of the resultant epoxide composition. Admixtures of cumylphenol and alpha-methylstyrene dimer may be readily obtained as a by-product from the commercially used process for making cumene from phenol. In this process, this by-product appears as a bottoms product in the purification of the cumene along with other high molecular weight products. The desired admixture may be separated by conventional vacuum distillation of the bottoms or the bottoms may be used directly without purification.

In another embodiment of the invention, cumylphenol and derivatives thereof have been found useful as reactive diluents for epoxy, furan and phenolic resins. The glycidyl ether derivative may also serve this function for urethane resins. These ethers are new compositions of matter and provide a low cost replacement for conventionally employed co-monomeric materials. In certain instances, their use improves the chemical and physical properties of the cured resins.

In still another embodiment of the invention, it has been found that esters of cumylphenol are useful as non-reactive plasticizers for polyurethanes. The benzoate and the higher acyl esters, which are unique compounds, may be used for rigid polyvinyl chloride. Here again the cost of the finished resin may be markedly reduced.

The derivatives of cumylphenol which are useful in the invention may be represented by the following formula:

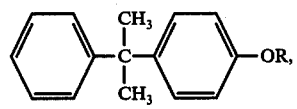

where R is an acyl group,

where R' is an alkyl, aryl, or aralkyl group having 1 to 12 carbon atoms, or a glycidyl group having 3 to 6 carbon atoms. Most preferably, R' is a methyl, an ethyl, or a long chain alkyl group, and the glycidyl group is

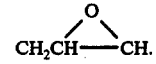

Certain of these compounds are well known in the art. The acetyl derivative is described by Tsivunin et al., Biol. Akliv. Soldin. 1968, 172-175 (Russ.). However, some are new compositions of matter, viz., the glycidyl ether, the benzoate ester and the higher acyl esters of cumylphenol. Of this latter group, the most important are the esters where R' has from 6 to 10 carbon atoms.

Where the cumylphenol or its esters are used as accelerators for amine-cured epoxy systems, the amount of the cumylphenol materials may range from 5 to 30%, preferably from 10 to 20%, based on the weight of resin to be cured. Any of the conventional amine-curing systems may be used, e.g., aliphatic polyamines, aromatic polyamines and polyaminoamide.

In this application, the epoxy resin in the liquid state is placed in a reactor and mixed with the amine-curing system. Generally from 5 to 50 parts of curative are used along with the cumylphenol accelerator. The reaction mass is heated to a temperature in the range of from 0° to 250° C. at pressures from 10 mm Hg to 5 atm. until the desired cure is achieved.

Where the cumylphenol derivatives are used as reactive diluents, they may be present in from about 10 to about 200 parts per 100 parts of the resin, preferably from about 20 to about 50 parts.

In non-reactive plasticizer applications, from 15 to 60 wt. %, preferably from 20 to 40 wt. %, of the appropriate ester of the cumylphenol is used based on total weight of resin.

In the applications of the invention where the cumylphenols are used as reactive diluents or non-reactive plasticizers, the cumylphenol compound is initially blended with the appropriate resin along with other desired components. The blend is feed to the polymerizing reactor and the resin polymerized in accordance with known techniques for the particular resin.

Where the cumyl phenols are used as reactive diluents for epoxy resins, any known curing system may be used. If an amine system is used, the cumylphenol may also have an accelerating effect; however, other curing systems, e.g., anhydrides, are fully acceptable.

The resins which are cured and formed in the practice of the invention, with the exception of polyvinyl chloride, may be generically referred to as "liquid thermoset resins." By this term is meant resins which are in the liquid state under conditions of application and include casting resins, i.e., liquid monomers or incompletely polymerized polymers, usually containing catalysts or curing agents, capable of becoming hard after they are cast in molds; and coating resins, i.e., liquid monomers or incompletely polymerized polymers, optionally in a solvent or non-solvent extender, which are capable of application by casting, potting, brushing, rolling, spraying or dipping. These include paints, varnishes, enamels, lacquers, and casting and potting resins.

The resins of particular interest in the instant invention are epoxy resins, furans, phenolics, urethanes and polyvinyl chloride. These may briefly be described as follows:

A wide variety of epoxy resins are described in U.S. Pat. Nos. 2,698,315, issued Dec. 28, 1954; 2,707,708, issued May 3, 1955; and 2,705,223, issued Mar. 29, 1955, all of which are incorporated herein by reference.

These resin are commonly complex polymeric reaction products of polyhydric alcohols with polyfunctional halohydrins such as epichlorohydrin and glyceryl dichlorohydrin. The products obtained may contain terminal epoxy groups, or terminal epoxy groups and terminal primary hydroxyl groups. See, for example, Column 6 of U.S. Pat. No. 2,872,428, issued Feb. 3, 1959.

The furan resins are thermosetting resins obtained primarily by the condensation polymerization of furfural alcohol in the presence of a strong acid, sometimes in combination with formaldehyde or furfural. The term also includes resins made by condensing phenol with furfuryl alcohol or furfural, and furfuryl-ketone polymers.

Phenolic resins are a family of thermoset resins made by the reaction of phenols with aldehydes such as formaldehyde, acetaldehyde, or furfural in the presence of either acidic or basic catalysts. For casting, B-stage resins are generally used. Examples of the phenols are di- and trivalent phenols such as cresol, resorcinol and cardanol. In casting resin applications, a large excess of formaldehyde is generally used with sodium hydroxide as the catalyst. The reaction is usually carried out at about 64° C.

The polyurethanes are a family of resins produced by reacting diisocyanates with organic compounds containing two or more active atoms to form polymers having free isocyanate groups. A detailed description of these resins is given in U.S. Pat. No. 3,060,137, issued Oct. 23, 1962. These groups, under the influence of heat or catalyst, will react with each other or with water, glycols, etc., to form thermosetting materials.

Rigid polyvinyl chloride resins optionally contain extenders, pigments, stabilizers and a small proportion of plasticizers wherein the proportion of plasticizer is insufficient to reduce tensile modulus below about 2000 psi.

The following two examples show the embodiments of the invention relating to the use of cumylphenols as accelerators in amine-cured epoxy systems:

EXAMPLE 1

This example shows the use of a blend of 60% cumylphenol, 34% alpha-methylstyrene dimer and 6% acetophenone as an accelerator for the cure of epoxy resins. The composition has the following properties:

| | |
|---|---|
| Specific Gravity at 25° C. | 1.052 |
| Viscosity at 25° C., cps | 99 |
| Distillation Range (5%–95% ASTM D-86), ° C. | 236–327 |
| Flash Point COC, ° F. | 275 |
| Hydroxyl Number | 171 |
| Avg. Molecular Weight (Calc.) | 209 |
| Gardner Color | 9–10 |
| Pour Point, ° F. | Below 40 |

Tests were performed with Epon 828 (trademark of Shell Chemical Co.), an epoxy resin having an epoxy equivalent of 185 to 192 with two curatives, namely, diethylenetriamine and triethylenetetramine. The admixture of the invention was compared to conventional accelerators, namely, nonylphenol and dinonylphenol. The compositions are shown in the following table along with the gel time, cure time, and Shore D hardness of the cured compositions.

Table I

| Compound No. | 1 | 2 | 3 | 4 | 5 | 6 | 7 | 8 |
|---|---|---|---|---|---|---|---|---|
| Epoxy Resin (185-192 Epoxide Equivalent) | 10 | 100 | 100 | 100 | 10 | 10 | 10 | 10 |
| Diethylenetriamine | 10 | — | 10 | 10 | 10 | — | — | — |
| Triethylenetetramine | — | 12 | — | — | — | 12 | 12 | 12 |
| Nonylphenol | — | — | 20 | — | — | 20 | — | — |
| Dinonylphenol | — | — | — | 20 | — | — | 20 | — |
| Cumylphenol Blend | — | — | — | — | 20 | — | — | 20 |
| Gel Time, minutes | 74 | 68 | 28 | 40 | 28 | 28 | 36 | 24 |
| Cure Time, minutes | 158 | 150 | 107 | 125 | 112 | 98 | 120 | 102 |
| Shore D Hardness, 24 hrs. at 20° C. | 85 | 85 | 85 | 82 | 87 | 86 | 80 | 86 |

The above data show that the cumylphenol blend has a superior cure rate as compared with the unaccelerated runs. This material also shows superiority to the dinonylphenol accelerator but is about 10–20% slower than the nonylphenol. Considering the ready availability of the aforesaid blend and the fact that it contains considerably less of the phenolic compound than the pure nonylphenol, its activity as an accelerator is particularly outstanding.

EXAMPLE 2

Four epoxy resin formulations were prepared, the first without an accelerator; the second with the prior art accelerator, nonylphenol; and the last two with different levels of high purity cumylphenol. The cumylphenol had the following physical properties:

| | |
|---|---|
| Appearance: Light tan crystalline material | |
| Specific Gravity, 25/25° C. | 1.094 |
| Flash Point, COC, ° F. | 345 |
| Drop Melting Point, ° F. | 154 |

Table II shows the specific composition of the formulations, the gel and cure times, and the Shore D hardness of the cured material:

Table II

| | 1 | 2 | 3 | 4 |
|---|---|---|---|---|
| Epon 828 | 100 | 100 | 100 | 100 |
| Triethylenetetramine | 12 | 12 | 12 | 12 |
| Nonylphenol | — | 20 | — | — |
| Cumylphenol | — | — | 20 | 10 |
| Gel Time, min. | 68 | 28 | 14.5 | 22 |
| Cure Time, min. | 150 | 107 | 78 | 96 |
| Shore D Hardness, 24 hrs., at 20° C. | 85 | 85 | 93 | 89 |

The above table not only shows the improved cure and gel times achieved by using the cumylphenol, but it also shows that, at only half the level of the prior art accelerator, improvement is realized. Furthermore, the cumylphenol, particularly at the level of Formulation No. 4, improves the Shore D hardness, a result not realized with the nonylphenol.

The following Examples 3 to 10 illustrate the effectiveness of the cumylphenols as reactive diluents for epoxy, furan, phenolic and urethane resins.

EXAMPLE 3

This example shows the effect of cumylphenol and its derivatives on the physical properties of epoxy resins. Formulations were prepared using Epon 828 (average viscosity, 16,000 centipoise) epoxy resins, 100 parts; triethylenetetramine as a curative, 12 parts; and Berkley #1 sand in amounts shown in the following table; and with cumylphenol and its acetate and glycidyl ether derivatives. The compressive strength and the tensile strength of compositions, cured at ambient temperature, were measured after five days. The following table shows the formulations and the results obtained:

Table III

| Additive | Parts by Weight | Epoxy | Sand | Compressive Strength, psi M | Tensile Strength, psi M |
| --- | --- | --- | --- | --- | --- |
| None | — | 88 | 200 | 12.0 | 0.9 |
| " | — | 88 | 250 | 10.9 | 0.76 |
| " | — | 88 | 300 | 9.5 | 0.71 |
| " | — | 88 | 350 | NP | NP |
| Cumylphenol | 22 | 66 | 200 | 17.3 | 1.2 |
| " | 22 | 66 | 250 | 16.9 | 1.0 |
| " | 22 | 66 | 300 | 16.5 | 0.91 |
| " | 22 | 66 | 350 | 15.8 | 0.82 |
| " | 22 | 66 | 400 | NP | NP |
| Cumylphenyl Acetate | 22 | 66 | 200 | 19.4 | 1.65 |
| " | 22 | 66 | 250 | 18.1 | 1.51 |
| " | 22 | 66 | 300 | 17.3 | 1.38 |
| " | 22 | 66 | 400 | 14.8 | 1.16 |
| " | 22 | 66 | 450 | 12.1 | 0.94 |
| " | 22 | 66 | 500 | NP | NP |
| Cumylphenyl Glycidyl Ether | 22 | 66 | 200 | 14.6 | 1.08 |
| " | 22 | 66 | 250 | 13.7 | 0.98 |
| " | 22 | 66 | 300 | 12.1 | 0.92 |
| " | 22 | 66 | 400 | 9.9 | 0.83 |
| " | 22 | 66 | 450 | NP | NP |

NP = non-pourable

The above table clearly shows that the compressive strength and the tensile strength are markedly improved by substituting the cumylphenol or its derivatives for a portion of the epoxy composition. The table further shows that 400, 500 and 450 parts were added in the cases of the cumylphenol, the cumylphenyl acetate and the cumylphenyl glycidyl ether, respectively, before the non-pourable condition occured. This shows that the aditives of the invention all have an effect of reducing the viscosity of the mixture. This is of great advantage, since it permits higher loading and lower cost compositions.

EXAMPLE 4

Two anhydride cure epoxy resin formulations were prepared, the first using a reactive diluent known in the art, cresyl glycidyl ether, and the second acetyl p-cumylphenol of the invention. The compositions and flexural strength of the product cured for 20 minutes at 375° F. are shown in the table below:

Table IV

|  | 1 | 2 |
| --- | --- | --- |
| Epoxy 6010 | 80 | 80 |
| Cresyl glycidyl ether | 20 | — |
| Acetyl para-cumylphenol | — | 20 |
| Dodecylsuccinic anhydride | 50 | 50 |
| Flexural strength | 13.5 M | 20.3 M |

The above table shows that in comparison to the reactive diluents of the prior art the acetate ester of cumylphenol results in a product having a substantially higher flexural strength. Additionally, this example shows the application of cumylphenol derivatives in anhydride-cured epoxy resins, as well as the amine-cured system shown in Example 3.

EXAMPLE 5

This example shows the effect of acetyl p-cumylphenol on the viscosity of epoxy flooring compounds. A control compound containing 100 parts of Resiplex 1628 (trademark of Resyn Corp. for an epoxy resin having a viscosity of 12,000 cps) was admixed with 20 parts of an accelerated proprietary aliphatic polyamine hardener (Celanese 874) and 160 parts of Colorquartz #28 (trademark of 3M Co.). Additional compositions were formulated, the first containing 65 parts of the Resiplex and 35 parts of the acetyl p-cumylphenol, and the second 50 parts each of the Resiplex and the acetyl p-cumylphenol. It was found that the sand content could be increased to 260 and 300 parts in these compositions, respectively, without adversely affecting the "trowel feel" of the composition. Savings are realized not only in increasing the amount of filler present but by using the low cost acetyl p-cumylphenyl derivative in place of the expensive epoxy resin.

EXAMPLE 6

This example shows the use of cumylphenyl derivatives as a replacement for furfuryl alcohol in furfural epoxy systems. Four formulations were prepared. The first formulation served as a control and represents a typical epoxy-furfural system using a phenyl glycidyl ethermodified resin. Formulation 2 is substantially the same as the first, but shows the use of a less expensive unmodified epoxy resin. Formulations 3 and 4 show the application of the instant invention whereby the acetyl p-cumylphenol serves to replace the furfuryl alcohol. Table V shows the specific compositions employed. The viscosity of the formulations and their physical properties were tested.

Table V

| Formulation | 1 | 2 | 3 | 4 |
| --- | --- | --- | --- | --- |
| Epoxy 6004* | 73 | — | — | 44 |
| Epoxy 6010* | — | 73 | 44 | — |
| Furfuryl Alcohol | 27 | 27 | — | — |
| Acetyl p-Cumylphenol | — | — | 29 | 29 |
| Graded Sand (Pre-blended) | 376 | 376 | 376 | 376 |
| Methylene dianiline (Pre-blended) | 24 | 24 | 24 | 24 |

*Ciba-Geigy trademark of epoxy resins

Formulation 2 was of little use since it was not pumpable. On the other hand, Formulation 3 had a viscosity comparable to Formulation 1, and Forumlation 4 was even less viscous than the control. Furthermore, the physical properties, such as hardness, tensile and compressive strength, of Formulations 3 and 4 were all within ±10% of the control, again with Formulation 4 showing a slight edge.

EXAMPLE 7

This example shows the use of the cumylphenol, its derivatives, and blends thereof as a replacement for furfuryl alcohol in a typical furane resin system. Table VI below shows the compositions tested:

Table VI

|  | 1 | 2 | 3 | 4 |
| --- | --- | --- | --- | --- |
| Furfural | 40 | 40 | 50 | 40 |
| Furfuryl Alcohol | 60 | — | — | 30 |
| Acetyl p-cumylphenol | — | 60 | — | — |
| Cumylphenol | — | — | 50 | — |
| Cumylphenol Blend* | — | — | — | 30 |

Table VI-continued

|  | 1 | 2 | 3 | 4 |
|---|---|---|---|---|
| Coke Flour | 200 | 200 | 200 | 200 |
| para-Toluene Sulfonic Acid | 5 | 9 | 9 | 9 |
| Sulfamic Acid | tr. | tr. | tr. | tr. |
| Qualitative Properties |  |  |  |  |
| Hardness | Brittle | Flexible | Very Hard | Hard |
| Impact | Very Poor | Very Good | Fair | Good |
| Rebound | Poor | Very Good | Fair | Fair |
| Chemicals | Poor | Good | Very Good | Good |

*See Example 1.

The acetyl p-cumylphenol as compared with the furfural-furfuryl alcohol control had improved flexibility as well as impact rebound and chemical properties. On the other hand, the cumylphenol provided a very hard material with somewhat improved impact and rebound properties and very good chemical resistance. Finally, the cumylphenol blend resulted in a harder material with good impact and chemical resistance and improved rebound properties. Considering the substantially lower cost of the materials discussed herein, the improved chemical and physical properties are particularly surprising. The properties obtained are comparable to phenolic resins.

Still another advantage is that one can use an unmodified epoxy resin (6010) rather than the phenyl glycidyl ether-modified resin (6004) conventionally used in such coating compositions.

EXAMPLE 8

To show the usefulness of cumylphenyl derivatives for replacing the phenolic component in baking resins, five formulations were prepared. The first consisted of the conventional epoxy phenolic composition; the second, third and fourth showed the replacement of 25%, 50% and 75% of phenolic resin with the acetyl p-cumylphenol; and the last showed complete replacement. The specific compositions are shown in the following table:

Table VII

| Formulations | 1 | 2 | 3 | 4 | 5 |
|---|---|---|---|---|---|
| Epon 828 Epoxy Resin | 37.5 | 37.5 | 37.5 | 37.5 | 37.5 |
| Bakelite Phenolic Resin, #BKR-2620 | 25.5 | 19.1 | 12.7 | 6.4 | — |
| Acetyl p-cumylphenol | — | 6.4 | 12.7 | 19.1 | 25.5 |
| Melamine | 25.0 | 25.0 | 25.0 | 25.0 | 25.0 |
| Solvent | 220.0 | 220.0 | 220.0 | 220.0 | 220.0 |

The compounds of the invention, namely, those Formulations 2 through 5, cured and behaved comparably to the control. Where the control had a shelf life of approximately three months, each of these latter formulations had shelf lives exceeding three months with no increase in viscosity observed.

EXAMPLE 9

Part I

This example shows the effect of the addition of cumylphenol as a modifier using a conventional phenolic resin. A basic formulation was prepared containing the following:

| Phenolic Resin Bakelite, #BRNA-5345 | 100 parts |
|---|---|

-continued

| Colorquartz #28 | 300 parts |
|---|---|
| Toluene sulfonic acid | 5 parts |
| Hexamethylenetetramine | 10 parts |

The aforesaid formulation was cured for 10 minutes at 375° F. and the tensile strength compared to formulations wherein 10 and 20 parts by weight of furfural:-cumylphenol (2:3 dry weight) monomer mixture were used with 90 and 80 parts, respectively, of the phenolic resin.

Tensile strength on the three cured compositions showed 350, 430 and 490 for the unmodified resin, the 90:10 and the 80:20 modified resins, respectively. This clearly shows that the monomer mixture is useful in improving the physical characterisitcs of phenolic systems.

Part II

Using the basic formulation described in Part I, various proportions of the phenolic resin were replaced by equal weights of the monomer mixtures shown below. In each case, the monomer mixture contained 2 parts of furfural and 3 parts of phenolic monomer. The tensile strength of each formulation was tested. The composition of the formulations are shown in the table below.

Table VIII

| Parts Replaced | Monomer Mixture Added | Tensile Strength, psi |
|---|---|---|
|  | Mixture |  |
| — | None | 350 |
| 25 | Furfural-cumylphenol | 570 |
| 50 | Furfural:cumylphenol | 730 |
| 100 | Furfural:cumylphenol | 910 |
| 25 | Furfural:cumylphenyl acetate | 380 |
| 100 | Furfural:cumylphenyl acetate | 560 |
| 25 | Furfural:nonylphenol | 380 |
| 100 | Furfural:nonylphenol | 480 |

The above table shows that the replacement of the phenolic resin by the furfural cumylphenol monomer mixtures results in continually improved tensile strength, up to the point where, when the phenolic resin is completely replaced, a composition having almost three times the tensile strength is obtained. In the case of the cumylphenyl acetate, an improvement is noted, but not to as great a degree as with the cumylphenol monomer mixture. In contrast, the use of the furfural-nonylphenol mixture, a mixture not within the scope of the instant invention, shows comparatively little improvement in properties.

The use of the monomer mixtures of the invention to replace all or part of the phenolic resins results in advantages other than the mere tensile strength improvement. For example, these mixtures are more easily handled because they are more fluid than the phenolic resin per se. Additionally, the furfural-cumylphenol monomers may be used under conditions where the conventional phenolic resins' constituent monomers cannot because of the latters' high volatility and toxicity.

EXAMPLE 10

This example shows the use of cumylphenyl glycidyl ether as a reactive diluent for polyurethane.

Part I

The cumylphenyl glycidyl ether was prepared as follows: A 3-liter flask equipped with a mechanical stirrer, thermometer, addition funnel, and external heating and cooling devices was charged sequentially with 1 liter of benzene, 1 liter of 4.5 wt. % aqueous sodium hydroxide and 1 mole of cumylphenol. The cumylphenol benzene dispersion formed after mixing was cooled to 10°-15° C., mixed and maintained at 10°-15° C. during the addition of 1.1 moles of epichlorohydrin over a four hour period. After the addition of the chlorohydrin, the reaction mix was warmed to 50° C. for 8 hours. The two phases which formed were separated and the water phase discarded. The organic phase was thrice washed with cold water and the residual organic material fractionated. 190 grams (71 mole %) of a pile yellow oil having a boiling point at 5 mm Hg of 258°-263° C. was obtained. The oil had an Epoxide Number determined by $MgCl_2$-HCl titration of 3.72 meq/g, while the theoretical Epoxide Number for cumylphenyl glycidyl ether is 3.73 meq/g.

Part II

Five polyurethane compositions containing 100 parts by weight of polyurethane (Adiprene CM, trademark of E. I. DuPont deNemours & Co.), a reaction product of diisocyanate and polyalkylene ether glycol, 30 parts of HAF carbon black, 1 part of mercaptobenzothiazole, 4 parts of 2,2'-benzothiazyl disulfide, 0.5 part of zinc chloride-2,2'-benzothiazyl disulfide, 0.75 part of sulfur and 0.5 part of cadmium stearate were prepared. The first formulation contained no plasticizer or reactive diluent. Second, third and fourth formulations were also prepared, these containing dioctyl phthalate (DOP), dioctyl sebecate (DOS) and a heavy aromatic naphtha oil diluent (Sundex 790, a trademark of Sun Oil Company), respectively. The first two of these materials are conventionally known non-reactive plasticizers, while the fourth is a reactive plasticizer. To a fifth formulaton, 15 parts by weight of the cumylphenyl glycidyl ether (CGE) of the invention was added. The compositions were cured for 60 minutes at 140° C., and the physical properties tested. The results are shown in the following table:

Table IX

|  | 1 | 2 | 3 | 4 | 5 |
|---|---|---|---|---|---|
| Plasticizer | None | DOP | DOS | Naphtha | CGE |
| 300% Modulus psi | 2850 | 1900 | 1750 | 1700 | 1810 |
| Tensile psi | 4050 | 3800 | 3550 | 4550 | 5200 |
| Elongation at Break % | 420 | 470 | 460 | 540 | 530 |
| Hardness Durometer A | 70 | 62 | 61 | 62 | 67 |

The above data clearly show that the cumylphenyl glycidyl ether of the invention was effective in reducing the modulus of the polyurethane formulation. They further show that it is substantially better than the other plasticizers, since the cured composition has a much better tensile strength and, of the compositions tested, there is the least loss of hardness. This combination of properties is particularly useful, as will be readily recognized by one skilled in the art, and most surprising and unexpected. Furthermore, even in the case of the naphtha oil, the other reactive diluent, the tensile strength was much better. This may be attributable to the glycidyl ether improving the cure.

The following Examples 11 to 13 show the use of certain cumylphenol derivatives as non-reactive plasticizers for the specified resins.

EXAMPLE 11

This example shows the use of acetyl p-cumylphenol as a non-reactive plasticizer for urethane resin. The following formulations were prepared:

Table X

| Formulation | 1 | 2 | 3 | 4 |
|---|---|---|---|---|
| Polyurethane resin* | 100 | 100 | 100 | 100 |
| Dioctyl phthalate | — | 25 | — | — |
| Diethyleneglycol dibenzoate | — | — | 25 | — |
| Acetyl p-cumylphenol | — | — | — | 25 |
| 300% Modulus, psi | 1570 | 1040 | 1110 | 1070 |
| Elongation, % | 760 | 920 | 900 | 940 |
| Tensile, psi | 8500 | 4580 | 5270 | 5750 |

*A polytetramethylene ether glycol-based thermoplastic having a Shore A hardness of 90.

The above data show that the acetyl p-cumylphenol provides a combination of higher elongation and much higher tensile strength and similar modulus efficiency as compared with widely known plasticizers for urethanes.

EXAMPLE 12

This example shows the utility of p-cumylphenyl benzoate as a processing aid and lubricant for the extrusion of rigid PVC.

Part I

Cumylphenyl benzoate is prepared in accordance with the following procedure: one mole of cumylphenol was dissolved in 600 ml of benzene containing 1.2 moles of triethylamine in a 2-liter stirred glass reactor equipped with external heating and cooling devices. The reaction mass was cooled to and maintained at 15°-20° C. during the addition of 1.1 moles of benzoyl chloride over a period of 1.5 hours. After completion of addition, the resulting slurry was heated to and maintained at 40°-45° C. for 1 hour, and thereafter cooled to ambient temperature and filtered. The filter cake was washed with 200 ml of toluene and the combined washings and filtrate distilled to give 214.9 g (68 mole %) of a pale yellow oil having a boiling point at 0.5 mm Hg of 261°-265° C., a specific gravity at 55° C. of 1.082, and a viscosity at 55° C. of 215 cps. On standing, the oil solidified to form a while solid having a melted point of 43°-46.5° C.

Part II

The following formulations were premixed in a high intensity mixer (Disona) and ambient temperature and extruded through a standard type 4 inch pipe die at 180° ±10° C., at a fixed power input. The physical properties of the extrudate and the rate of extrusion are also shown in the table below:

Table XI

| Formulations | 1 | 2 |
|---|---|---|
| PVC resin* | 100 | 100 |
| Triphenyl phosphite (stabilizer) | 0.5 | 0.5 |
| Diphenyl phthalate (processing aid) | 1.0 | — |
| Calcium stearate | 1.0 | 1.0 |
| Oxidized polyethylene (Allied Chemical Corp. AC 629A) | 0.2 | — |
| Wax (Hoechst XL165) | 1.0 | 2.2 |
| Cumylphenyl benzoate | — | 1.0 |
| Extrusion Rate, inches/min. | 8" | 10.4" |
| Impact Strength, psi | 205 | 210 |

Table XI-continued

| Formulations | 1 | 2 |
|---|---|---|
| Flexurl Strength, psi | 16.2M | 19.1M |

*VC 100, Bordon Chemical trademark for a low to medium molecular weight resin.

The addition of the benzoate ester resulted in a 24% extrusion rate improvement and an 18% flex strength improvement, without any sacrifice of impact strength. Other experiments show that the benzoate ester is unique in this regard and that similar improvements do not result from other cumylphenol derivatives.

EXAMPLE 13

This example shows the use of a higher alkyl ester of cumylphenol as a non-reactive plasticizer for polyvinyl chloride.

Part I

Cumylphenyl 2-ethylhexanoate was prepared in accordance with the following procedure: a 2-liter flask equipped with a mechanical agitator, a 10 theoretical plate fractionating column, an automatic reflux splitter pot, vapor thermometers and thermocontrollers, a condenser, receivers, and external heating and cooling devices, was charged with 2 moles of cumylphenyl acetate, 5 moles of 2-ethylhexanoic acid and 5 grams of 98% sulfuric acid. Heat was supplied externally and the distillate was collected at a 20:1 reflux ratio at a vapor temperature below 120° C. at atmospheric pressure. A total of 64 cc of distillate was collected in 24 hours. The residual pot contents were cooled to ambient temperature and extracted 5 times with 2 liters of 8% sodium bicarbonate dried over anhydrous $Na_2SO_4$ and fractionated to give 408 g (58 mole %) of a pale yellowish oil. The oil had a boiling point at 0.2 mm Hg of 252°–257° C., a specific gravity 20/20 of 1.045 and a saponification value of 2.82 meq/g. The cumylphenyl 2-ethylhexanoate ester has a theoretical saponification value of 2.85 meq/g.

Part II

To show the efficacy of the 2-ethylhexanoate ester as a plasticizer for flexible polyvinyl chloride, 100 parts of a medium molecular weight PVC resin was admixed with 40 parts by weight of 5 micron calcium carbonate, and 2 parts by weight of Thermozard S stabilizer (a trademark of M & T Chemicals, Inc.). Three formulations were prepared. The first contained 30 parts by weight of triethylene glycol dibenzoate, the second 30 parts by weight of dioctyl phthalate, and the third 30 parts by weight of the cumylphenyl 2-ethylhexnoate of the invention. The following table shows the physical properties of the blend after cure:

Table XIII

| | 1 | 2 | 3 |
|---|---|---|---|
| Plasticizer | TGD | DOP | CPE |
| Hardness Shore A Scale | 78 | 75 | 76 |
| 100% Modulus | 1550 | 1320 | 1350 |
| Tensile Strength, psi | 2350 | 1890 | 2510 |
| % Elongation | 290 | 310 | 340 |

The above table clearly shows that the compound of the invention effectively reduces the modulus of the formulation. In comparison to the other plasticizers, the 2-ethylhexanoate ester-containing formulation has the best tensile strength and percent elongation.

We claim:

1. In a process for curing epoxy resins with an amine curing system, the improvement of polymerizing the resin in the presence of an accelerating amount of cumylphenol or a carboxylic acid ester thereof.

2. The process of claim 1 wherein the accelerator is cumylphenol in admixture with alphamethylstyrene dimer.

3. The process of claim 1 wherein the ester is the acetate or benzoate ester.

4. The process of claim 1 wherein from 5 to 30 weight percent of the cumylphenol or the carboxylic acid ester is present, based on the weight of the epoxy resin.

5. The process of claim 1 wherein the curing takes place at a temperature of from 0° to 250° C. at a pressure of from 10 mm Hg. to 5 atm.

6. The process of claim 1 wherein the amine curing system comprises an aliphatic polyamine, an aromatic polyamine, or a polyaminoamide.

7. A composition of matter which comprises an amine-cured epoxy resin which has been cured in the presence of an accelerating amount of cumylphenol or a carboxylic acid ester thereof.

8. The composition of matter of claim 7 wherein the accelerating amount of cumylphenol or carboxylic acid ester is from 5 to 30 weight percent based on the weight of the epoxy resin.

9. The composition of matter of claim 7 wherein the ester is the acetate or the benzoate ester.

10. A polymerizable composition which comprises an epoxy resin in admixture with from 10 to 200 parts by weight of cumylphenol or a carboxylic acid ester or glycidyl ether thereof for each 100 parts by weight of epoxy resin.

11. The polymerizable composition of claim 10 wherein from 20 to 50 parts by weight of the cumylphenol or the carboxylic acid ester or the glycidyl ether thereof are present for each 100 parts by weight of epoxy resin.

12. The product obtained by curing a mixture comprising (A) 100 parts by weight of an epoxy resin, (B) 10 to 200 parts by weight of cumylphenol or a carboxylic acid ester or glycidyl ether thereof, and (C) and epoxy resin curing agent.

13. The product of claim 12 wherein the ester is an acetate or a benzoate ester.

14. The product of claim 12 wherein from 20 to 50 parts by weight of said cumylphenol or the carboxylic acid ester or the glycidyl ether are present for each 100 parts by weight of the epoxy resin.

* * * * *